US006913456B2

(12) United States Patent  
Dantlgraber

(10) Patent No.: US 6,913,456 B2
(45) Date of Patent: Jul. 5, 2005

(54) DRIVE DEVICE FOR DISPLACING TWO LINEARLY MOVEABLE COMPONENTS PERTAINING TO A PLASTIC INJECTION MOULDING MACHINE

(75) Inventor: Jörg Dantlgraber, Lohr (DE)

(73) Assignee: Bosch Rexroth AG, Lohr/Main (DE)

( * ) Notice: Subject to any disclaimer, the term of this patent is extended or adjusted under 35 U.S.C. 154(b) by 73 days.

(21) Appl. No.: 10/415,561

(22) PCT Filed: Nov. 8, 2001

(86) PCT No.: PCT/EP01/12917

§ 371 (c)(1),
(2), (4) Date: Apr. 30, 2003

(87) PCT Pub. No.: WO02/40243

PCT Pub. Date: May 23, 2002

(65) Prior Publication Data

US 2004/0013764 A1 Jan. 22, 2004

(30) Foreign Application Priority Data

Nov. 14, 2000 (DE) ......................................... 100 56 404
Jan. 27, 2001 (DE) ......................................... 101 03 681

(51) Int. Cl.⁷ ............................................. B29C 45/68
(52) U.S. Cl. .................................. 425/574; 264/328.11
(58) Field of Search ................................ 425/150, 574; 264/328.11

(56) References Cited

U.S. PATENT DOCUMENTS

| 4,540,359 | A | * | 9/1985 | Yamazaki | .................... 425/135 |
| 4,820,464 | A | * | 4/1989 | Sasaki et al. | ............... 264/40.1 |
| 5,417,558 | A | * | 5/1995 | Heindel et al. | ............. 425/145 |
| 6,457,964 | B1 | * | 10/2002 | Yamaguchi et al. | ........ 425/150 |

FOREIGN PATENT DOCUMENTS

| JP | 60139419 | * | 7/1985 |
| JP | 06143372 | * | 5/1994 |
| WO | 0211969 | | 2/2002 |
| WO | 0240243 | * | 3/2002 |

* cited by examiner

Primary Examiner—Tim Heitbrink
(74) Attorney, Agent, or Firm—Martin A. Farber

(57) ABSTRACT

A drive device which is intended for displacing two linearly movable components of a plastics injection-molding machine at least partly at successive times, in particular for displacing the injection unit for bringing the injection nozzle into contact with a mold and for displacing the injection mechanism for injecting polymer into the mold. With a known drive device, arranged downstream of an electric rotating motor are two clutches, by which rotational movements are transmitted on the basis of frictional engagement, and with which wear accordingly occurs. Each clutch is followed by a threaded drive, by which the rotational movement of the output element of a clutch is transformed into the linear movement of the machine component to be displaced. To make the known drive device for a plastics injection-molding machine less susceptible to wear and less costly in a first way the threaded drive is arranged between the electric motor and the two clutches and, for displacing the one movable component, the linearly movable drive output element of the threaded drive is able to be moved beyond the displacement distance necessary for displacing the other movable component. In a second way the electric motor is an electric linear motor with a linearly movable drive output element, arranged downstream of which in the force chains are the two clutches, and for displacing the one movable component, the drive output element is movable beyond the displacement distance necessary for displacing the other movable component.

20 Claims, 3 Drawing Sheets

DRIVE DEVICE FOR DISPLACING TWO LINEARLY MOVEABLE COMPONENTS PERTAINING TO A PLASTIC INJECTION MOULDING MACHINE

FIELD AND BACKGROUND OF THE INVENTION

The invention relates to a drive device which is intended for displacing two linearly movable components of a plastics injection-molding machine at least partly at successive times, in particular for displacing the injection unit for bringing the injection nozzle into contact with a mold and for displacing the injection mechanism for injecting polymer into the mold.

Such a drive device is known from U.S. Pat. No. 4,540,359. Used there is an electric rotating motor, to move an injection unit including the injection nozzle up to an injection mold and away from the mold again, in order in this way to execute the so-called nozzle forward movement, and to move an injection mechanism including a plasticizing screw axially, for injecting polymer into the injection mold. The two movements take place completely separately at successive times. The electric motor is fastened laterally to the housing of the injection unit, its axis running parallel to the direction of the nozzle forward movement and the injection movement. The rotating electric motor can be used firstly for driving, by means of a belt gear mechanism, a shaft mounted rotatably in the housing of the injection unit, which passes through a gear wheel, which is either freely rotatable with respect to the shaft or can be coupled to the shaft by means of an electromagnetically operable clutch. The gear wheel meshes with a further gear wheel, which is fastened in a rotationally secure manner on a threaded spindle, which together with a linearly guided spindle nut forms a threaded drive, by means of which the rotating movement of the electric motor and the following elements of the gear mechanism is transformed into a linear movement of the injection mechanism. The intermediate shaft can be coupled by means of a second electromagnetically operable clutch to a threaded spindle which is in line with the intermediate shaft, is held in an axially fixed manner on the housing of the injection unit and meshes with a spindle nut arranged in a fixed manner on the machine frame.

To bring the injection unit up to the injection mold, the latter clutch is operated, while the first clutch is inoperative. Consequently, the threaded spindle arranged in line with the intermediate shaft is rotated and, as a result, the injection unit is brought up to the injection mold. When this has taken place, a blocking device is operated, which device prevents rotation of the second threaded spindle in relation to the housing of the injection unit. The second clutch is deactivated.

Then, the first clutch is operated and, as a result, a force chain from the electric motor to the first threaded spindle, and consequently to the injection mechanism, is closed. The latter moves axially forward, whereby previously plasticized polymer is injected into the injection mold.

A disadvantage of the known drive device is that the clutches, the input element and output element of which are rotatable in relation to each other, are subjected to relatively high wear. Altogether, the known drive device is quite complex, and consequently also very expensive.

SUMMARY OF THE INVENTION

The invention is accordingly based on the object of further developing a drive device of the introductory-mentioned features in such a way that it is less susceptible to wear and is of a relatively simple and low-cost construction.

The objective aimed for is achieved for a drive device of the introductory-mentioned features that is with a rotating electric motor, according to the invention wherein the mechanical gear mechanism is arranged between the electric motor and the two clutches, and, for displacing the one movable component, the linearly movable output element of the mechanical gear mechanism can be moved beyond the displacement distance necessary for displacing the other movable component. In the case of a drive device according to the invention, there is consequently no need for clutches in which the input element and output element rotate in relation to each other, and as a result can undergo wear. Moreover, only one threaded drive or one rack-and-pinion drive is necessary to allow both components to move. A threaded drive or a rack-and-pinion drive is generally quite expensive.

The objective aimed for is achieved in a second way in that the electric motor is an electric linear motor with a linearly movable output element, arranged downstream of which in the force chain are the two clutches and which, for displacing the one movable component, can be moved beyond the displacement distance necessary for displacing the other movable component.

Advantageous refinements of a drive device according to the invention are set forth herein.

The displacement distance by which the output element of the electric linear motor or the threaded or rack-and-pinion drive arranged downstream of the rotating electric motor can be moved can be readily made large enough that, the two movable components of the plastics injection-molding machine can be moved completely separately at successive times.

It is preferred for there to be in the force chain between the output element and a displaceable component a hydraulic gear mechanism with a first piston-cylinder unit, which has a first hydraulic cylinder, bounding a first cylinder chamber, and with a second piston-cylinder unit, which is located closer to the displaceable component in the force chain and has a second hydraulic piston, bounding a second cylinder chamber, the first cylinder chamber and the second cylinder chamber being fluidically connectable to each other. Such a hydraulic gear mechanism provides great flexibility with regard to the arrangement of the electric motor, since the distance between the two piston-cylinder units can be readily bridged by hydraulic lines. What is more, the effective area on the second hydraulic piston can be made slightly larger than on the first hydraulic piston, so that a force transmission is obtained, and the loading of the elements of the force chain that are located upstream of the hydraulic gear mechanism, for example the loading of a threaded drive, can be kept at a low level. The piston-cylinder units are, in particular, double-acting, so that the movable components can be displaced by the electric motor in opposite directions. It is conceivable in principle to form the blocking device for one movable component as a mechanical, positive locking mechanism. If, however, there is a hydraulic gear mechanism in a force chain, it is possible, in a particularly simple way for the blocking device to be a shut-off valve, by which the second cylinder chamber can be shut off with respect to the first cylinder chamber.

In the case of a design a second threaded drive and a second electric motor are used together with the hydraulic gear mechanism, the first threaded drive and the first electric motor. One of the two threaded drive elements which are in engagement with each other can be driven in a rotating manner by said second electric motor. One of the two threaded drive elements is arranged between the hydraulic gear mechanism and the displaceable component. This allows a force to be exerted on the movable component on the one hand via the gear drive and on the other hand via the hydraulic gear mechanism, the force exerted via the hydraulic gear mechanism not imparting any loading to the thread or any engagement elements of the threaded drive there may be. With the additional threaded drive it is possible to make the actual-value profile of the force and/or speed follow very exactly the desired-value profile, according to which the displaceable component is to be moved, since the mechanical force transmission is more rigid than that by means of the hydraulic gear mechanism.

The clutches are preferably constructed in a particularly simple manner according to features of the invention.

Two exemplary embodiments of a drive device according to the invention, by which the injection unit (nozzle forward movement) and the injection mechanism (injection movement) of a plastics injection-molding machine can be respectively displaced and which have a rotating electric motor and a threaded drive arranged downstream of the latter, are represented in the drawings. The invention is then explained in more detail on the basis of these drawings, in which:

DETAILED DESCRIPTION OF THE PREFERRED EMBODIMENT

Figure 1:
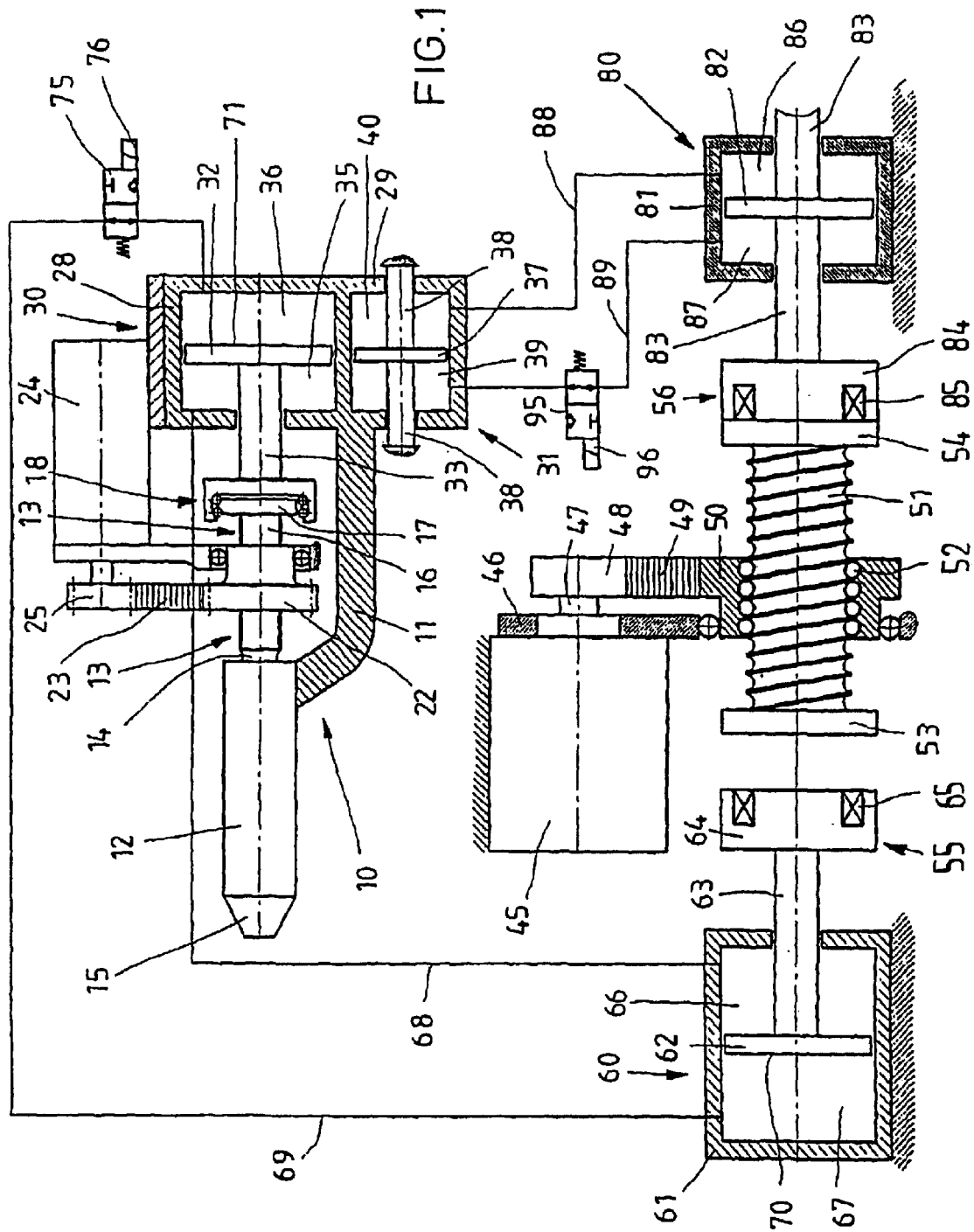
FIG. 1 shows the first exemplary embodiment, in which the screw of an injection mechanism can be displaced by a single electric motor by means of a threaded drive and a hydraulic gear mechanism arranged downstream of the latter, FIG. 2 schematically shows a complete movement sequence of the threaded drive during the working cycle of a plastics injection-molding machine

According to FIG. 1, a plastics injection-molding machine, which is not represented in any more detail in its entirety, has an injection unit 10 with a housing 11, on which a plasticizing cylinder 12 is arranged. Mounted on the housing 11 in a rotatable and axially displaceable manner is an injection mechanism 13, which comprises a screw 14 which is located substantially inside the plasticizing cylinder 12. A conical end of the plasticizing cylinder 12, facing an injection mold not represented, is designed as an injection nozzle 15. Outside the plasticizing cylinder 12, the screw 14 is adjoined by a splined shaft 16, which is fixedly connected to said screw, is provided with axially running splines and slots and at the free end of which a disk 17 is fastened. This disk is part of a ball bearing 18.

The splined shaft 16 is surrounded by a gear wheel 22, which is rotatably mounted in an axially fixed manner on the housing 11 and engages with splines and slots on its inside diameter in the splines and slots of the splined shaft 16. The gear wheel 22 is coupled by means of a toothed belt 23 to a pinion 25 seated on the motor shaft of an electric motor 24. The injection mechanism comprising the screw and splined shaft 16 can consequently be driven in a rotating manner by the electric motor 24, which is mounted on the housing 11. This drive serves for plasticizing the polymer granules and conveying the plasticized composition into the space located inside the plasticizing cylinder 12 between the end of the screw and the nozzle 15.

Fastened to the housing 11 of the injection unit 10 are the cylinder 28 of a piston-cylinder unit 30 and the cylinder 29 of a piston-cylinder unit 31. The piston-cylinder unit 30 is in line, with its axis, with the axis of the screw 14 and of the splined shaft 16 and has a differential piston 32 with a piston rod 33, which has at its free end a disk 34 with a collar protruding axially beyond the disk 17 of the splined shaft 16. The disks 17 and 34 are parts of the rolling-contact bearing 18, which ensures the rotatability of the splined shaft 16 in relation to the piston rod 33 and which can transmit axial forces in both directions between the piston rod 30 and the splined shaft 16. The differential piston 32 divides the interior of the cylinder 28 into an annular cylinder chamber 35 on the side toward the piston rod and a circular-cylindrical cylinder chamber 36 on the side away from the piston rod.

The piston-cylinder unit 31 has a synchronizing piston 37, which is provided on both sides with piston rods 38 of the same thickness and consequently divides the interior of the cylinder 29 into two annular cylinder chambers 39 and 40 of the same cross section. The two piston rods 38 are fastened to the machine frame in a way not represented in any more detail. The piston 37 consequently remains at rest with respect to the machine frame 46.

The drive source for the linear movement of the injection unit for bringing the nozzle 15 into contact with the mold and for moving the nozzle away from the mold, and also for the axial movement of the injection mechanism 13, is a second rotating electric motor 45, which is fastened to the machine frame 46 underneath the injection unit in a way not represented in any more detail such that its axis runs parallel to the axis of the injection mechanism, and consequently parallel to the direction of the linear movements of the injection unit and of the injection mechanism. Seated in a rotationally secure manner on the motor shaft 47 is a pinion 48, which is coupled by means of a toothed belt 49 to a spindle nut 50 which is mounted in an axially fixed manner on the machine frame 46 and provided with external toothing. The spindle nut 50 is provided on the inside with a ball rolling thread. Passing through it is a threaded spindle 51, which is provided with an external thread formed as a ball rolling thread. Balls 52 engage in the internal thread of the spindle nut 50 and in the external thread of the threaded spindle 51, so that these two parts are connected to each other by means of a screwed joint. The threaded spindle 51 is linearly guided in a way not represented in any more detail, consequently it cannot rotate, so that when there is rotation of the spindle nut 50 it moves linearly in one direction or in the opposite direction, depending on the direction of rotation. The electric motor 45 can rotate in two directions. At each end, the threaded spindle 51 bears a disk 53 and 54, respectively, which represents the input element of an electromagnetically operable clutch 55 and 56, respectively.

Arranged upstream of each input clutch disk 53, 54, in line with the threaded spindle 51, is a piston-cylinder unit 60 and 80, respectively. The piston-cylinder unit 60 has in a cylinder housing 61 a differential piston 62 with a piston rod 63, which protrudes from the cylinder housing 61 in the direction of the threaded spindle 51. At its outer end, the piston rod 63 bears a disk 64, which represents the output element of the clutch 55 and receives in it an electric coil 65, and together with the disk 53 on the threaded spindle 51 forms the electromagnetically operable clutch 55. The differential piston 62 divides the interior of the cylinder housing 61 into an annular cylinder chamber 66 on the side toward the piston rod and a circular-cylindrical piston chamber 67 on the side away from the piston rod. The cylinder chamber 66 is fluidically connected by means of a hydraulic line 68 permanently to the cylinder chamber 35 of the piston-cylinder unit 30. From the cylinder chamber 67, a hydraulic line 69 leads to the cylinder chamber 36 of the piston-cylinder unit 30. In this line 69 there is an electromagnetically operable 2/2-way seat valve 75, the rest position of which is the passage position and which can be brought by the electromagnet 86 into a shut-off position, in which it shuts off the cylinder chamber 36 with respect to the cylinder chamber 67 in a leak-free manner. According to FIG. 1, the effective area 70 of the hydraulic piston 62 adjacent to the cylinder chamber 67 is of precisely the same size as the effective area 71 of the hydraulic piston 32 adjacent to the cylinder chamber 36. Similarly, the cross sections of the piston rods 33 and 63 are of the same size, so that the mutually opposite effective areas of the hydraulic pistons 62 and 32, and consequently also the cross sections of the cylinder chambers 35 and 66, are also of the same size. Accordingly, no force is transmitted between the two piston-cylinder units 60 and 30. However, the hydraulic piston 62 can readily be made smaller than the hydraulic piston 32, so that the force exerted by means of the piston rod 33 on the injection mechanism 13 becomes higher than the force introduced via the piston rod 63. The cross sections of the piston rods 63 and 33 in relation to each other then also have the same ratio that exists between the cross sections of the cylinder chambers 67 and 36. When there is force transmission between the two piston-cylinder units 30 and 60, a high injection pressure can be applied, without the threaded drive 50, 51 and the toothed belt 49 being subjected to excessive loading. A smaller electric motor 45 can also be used than in the case of a solution without force transmission.

The piston-cylinder unit 80 upstream of the other end face of the threaded spindle 51 has a synchronizing piston 82, which is located in a cylinder housing 81 and has a piston rod 83 respectively on both sides. The two piston rods have the same cross section and leave the cylinder housing 81 at opposite end faces. The piston rod 83 directed toward the threaded spindle 51 bears at its end a disk 84, which receives in it a coil 85 and which, as an output element, together with the clutch disk 54 on the threaded spindle 51 forms the second clutch 56. The synchronizing piston 82 divides the interior of the cylinder housing 81 into two cross-sectionally coinciding cylinder chambers 86 and 87. The cylinder chamber 86 is fluidically connected by means of a hydraulic line 88 permanently to the cylinder chamber 40 of the piston-cylinder unit 31. From the cylinder chamber 87 of the piston-cylinder unit 80, a line 89 leads to the cylinder chamber 39 of the piston-cylinder unit 31. In this line 89 there is a 2/2-way seat valve 95, which at rest assumes its passage position and can be brought by the electromagnet 96 into a shut-off position, in which the cylinder chamber 39 is shut off with respect to the cylinder chamber 87.

According to FIG. 1, the cross sections of the cylinder chambers 86 and 87 of the piston-cylinder unit 80 are greater than the cross sections of the cylinder chambers 39 and 40 of the piston-cylinder unit 31. This means that between the two piston-cylinder units there is a step-down of the force and a step-up of the displacement distance. Consequently, a relatively small displacement distance of the hydraulic piston 82, and therefore of the threaded spindle 51, is sufficient to bring the injection nozzle from its rest position into contact with the mold and back again.

In FIG. 1, the injection unit 10 is intended to be shown in a state in which the injection nozzle 15 is at a distance from the injection mold. After plasticizing an appropriate amount of polymer material, the screw 14 and the entire injection mechanism as well as the hydraulic piston 32 with the piston rod 33 are in a withdrawn position. In the subfigure 2a, the corresponding positions of the threaded spindle 51 and of the input clutch disks 53, 54 and the output clutch disks 64 and 84 of the two clutches 55 and 56 are schematically shown. These coincide with the positions from FIG. 1.

Figure 2:
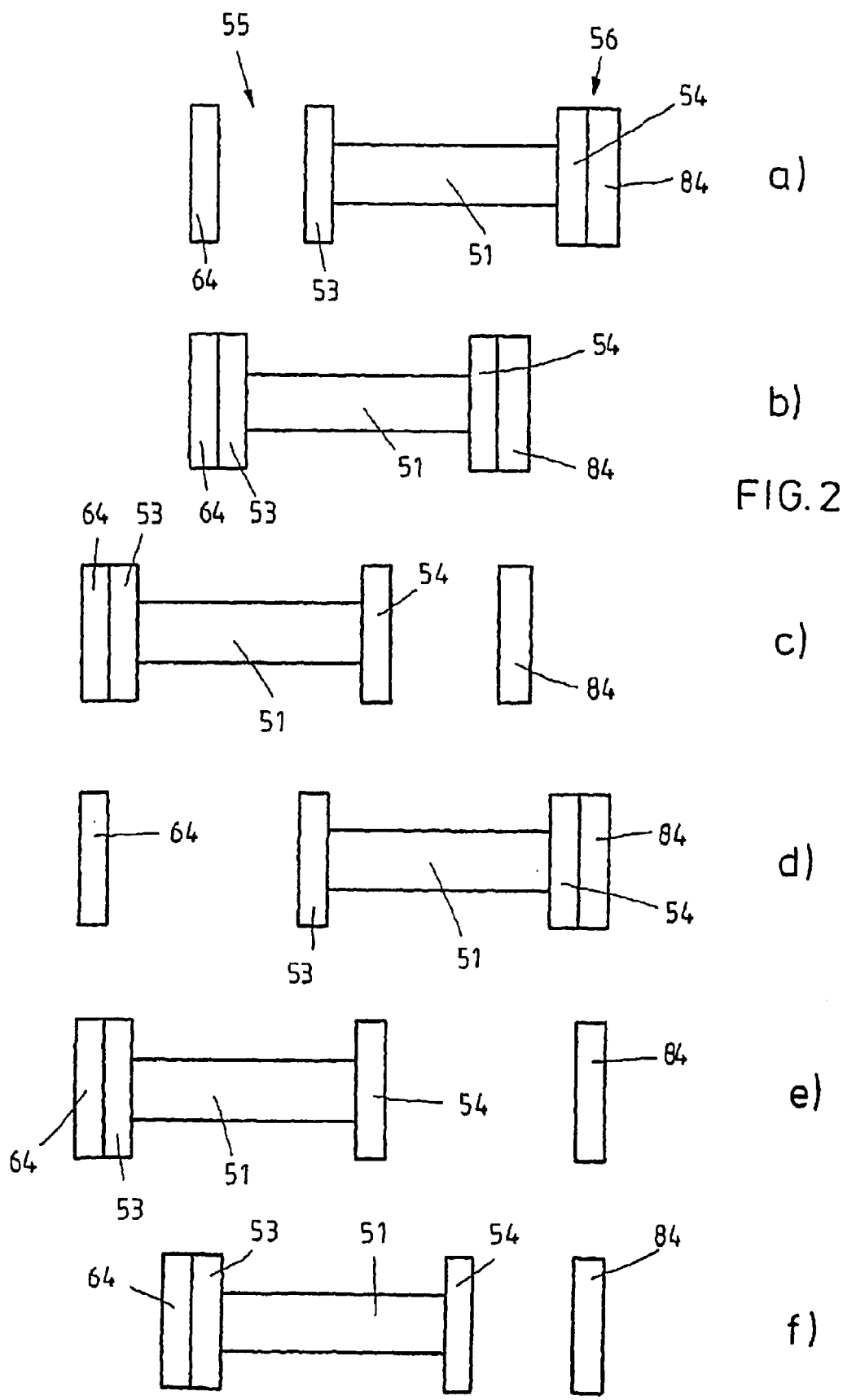

For injecting polymer into the mold, the nozzle 15 then first has to be brought up to the mold. For this purpose, the electric motor 45 is driven in a rotating direction, [lacuna] that the threaded spindle 51 is moved to the left, in the view according to FIGS. 1 and 2, toward the clutch disk 64 of the clutch 55. The clutch 56 is operated, so that the two clutch disks 54 and 84 of the clutch 56 adhere to each other, the hydraulic piston 82 follows the piston-cylinder unit 80, that is the threaded spindle 51. Pressure medium is forced out of the cylinder chamber 87 via the line 89 and the open shut-off valve 95 into the cylinder chamber 39 of the piston-cylinder unit 31. As a result, the entire injection unit 10 moves to the left. After the displacement distance of the threaded spindle 51 necessary for bringing the nozzle 15 into contact with the mold, the clutch disk 53 has, as shown in FIG. 2b, reached the clutch disk 64 of the other clutch 55. Then the shut-off valve 95 is first brought into its shut-off position and then the clutch 56 is deactivated. No pressure medium can flow out of the cylinder chamber 39 of the piston-cylinder unit 31, so that the injection unit remains with the injection nozzle 15 against the mold. The electric motor 45 continues to rotate in the same direction, so that the threaded spindle 51 moves further to the left and as a consequence displaces the piston rod 63 and the hydraulic piston 62 to the left by means of the clutch disks 53 and 64. As a result, pressure medium is forced out of the cylinder chamber 67 of the piston-cylinder unit 60 via the line 69 and the open directional control valve 75 into the cylinder chamber 36 of the piston-cylinder unit 30. The hydraulic piston 32 displaces the injection mechanism 13 to the left, so that polymer material is injected into the mold. The positions of the threaded spindle 51 and of the various clutch disks at the end of the injecting operation are shown in the subfigure 2c. While the threaded spindle 51 pushes the clutch disk 64 ahead of it by means of the clutch disk 53, the clutch 55 can also be activated. It is then possible for the component of the plastics injection-molding machine that is to be moved also to be slowed down by the drive source.

At the end of the injecting movement, the valve 75 is brought into its shut-off position, so that the injection mechanism 13 remains in its forwardmost position. The electric motor 45 is driven in the reverse rotating direction and, as a result, the threaded spindle 51 is moved to the right. The clutch 55 is inoperative. When the threaded spindle 51 has traveled the displacement distance covered for injection in the reverse direction, it hits with the clutch disk 54 against the clutch disk 84 of the clutch 56. Shortly before, the shut-off valve 95 is brought into its passage position again. The hydraulic piston 82 can then be displaced to the right, pressure medium being forced out of the cylinder chamber 86 into the cylinder chamber 40 and out of the cylinder chamber 39 into the cylinder chamber 87. The injection unit 10 is moved away from the injection mold. The end position of the threaded spindle 51 and of the various clutch disks is shown in the subfigure 2d. Then the shut-off valve 95 is brought into its shut-off position again, so that the injection unit 10 is blocked in its position. The clutch 56 is released. The electric motor 45 is driven in the first rotating direction again, so that the threaded spindle 51 is moved to the left up against the clutch disk 64 of the clutch 55, as shown in the subfigure 2e.

The polymer material is then to be plasticized and for this purpose a certain back pressure is to be maintained in front of the screw 14. For plasticizing, the electric motor 24 is switched on, rotating the injection mechanism 13 together with the screw 14 in such a direction that polymer material is conveyed in front of the screw. A certain pressure builds up there, with the tendency to displace the injection mechanism 13 together with the hydraulic piston 32 backward in the sense of reducing the cylinder chamber 36 of the piston-cylinder unit 30. With the shut-off valve 75 in the passage position, the speed, controlled by the electric motor 45, with which the threaded spindle 51 is moved to the right and thereby allows pressure medium to be forced out of the cylinder chamber 36 of the piston-cylinder unit 30 via the valve 75 and the line 69 into the cylinder chamber 67 of the piston-cylinder unit 60, can be used to set a specific back pressure or to proceed through a specific back pressure profile. A specific state of the threaded spindle 51 and of the clutch disks of the clutches 55 and 56 during the plasticizing operation is shown in the subfigure 2f. At the end of the plasticizing operation, the clutch disk 64 has again reached the position shown in the subfigure 2a. The threaded spindle 51 is moved further to the right up against the clutch disk 84 of the clutch 56.

In the case of another exemplary embodiment (not shown) with a rotating electric motor 45, the threaded spindle 51, the threaded nut 50 and the toothed belt 49 can be replaced by a toothed rack, which meshes directly with the pinion 48.

Furthermore, in the case of an exemplary embodiment with an electric linear motor, the axis of the latter is put in line with the piston rods 63 and 83 and provided at the two ends with the input element of the clutch 55 and the clutch 56, respectively.

Figure 3:
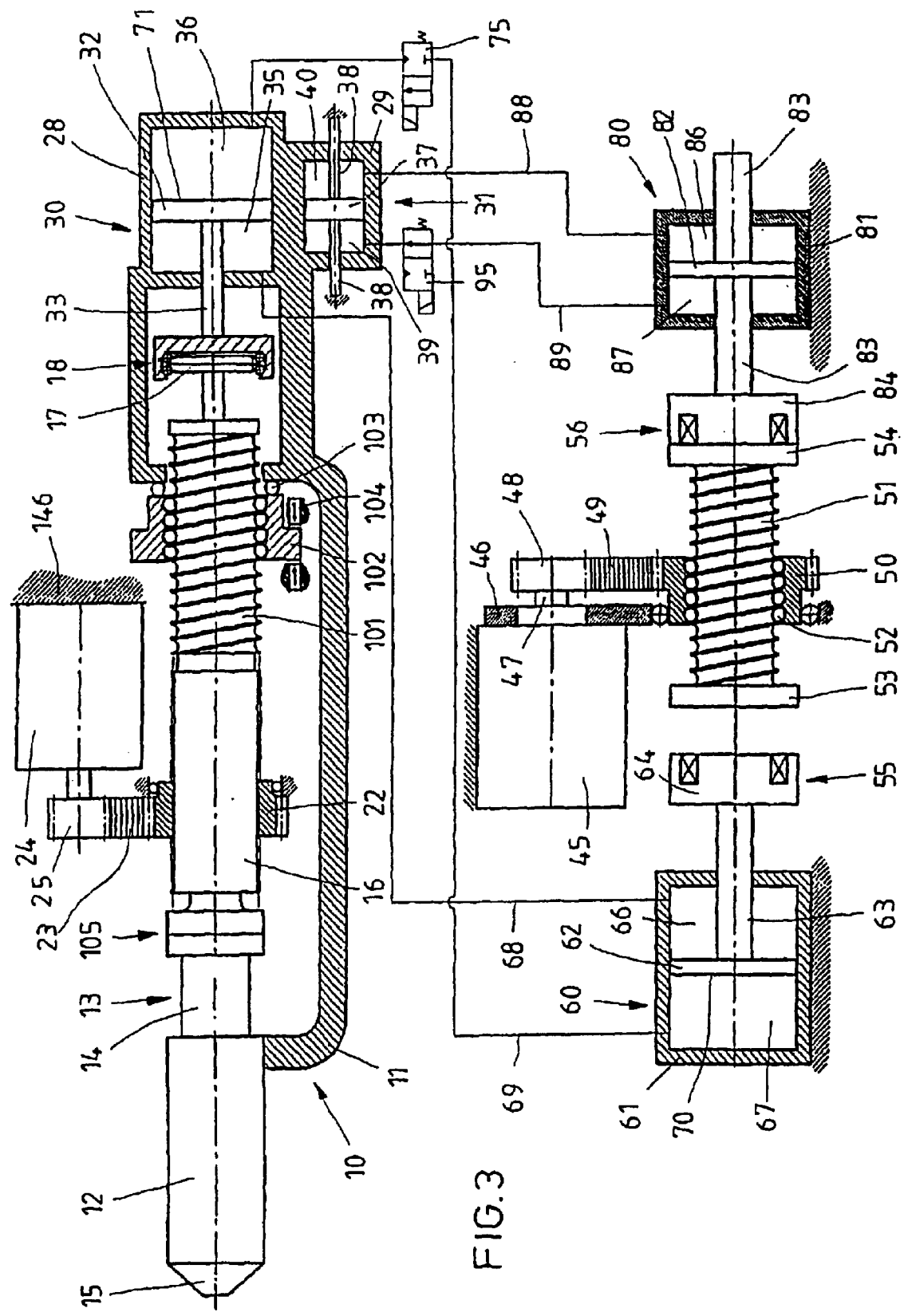
FIG. 3 shows the second exemplary embodiment, in which the screw of an injection mechanism can be displaced by a first electric motor by means of a threaded drive and a hydraulic gear mechanism arranged downstream of the latter can be displaced at the same time by a second electric motor by means of a second threaded drive.

The exemplary embodiment according to FIG. 3 differs from that according to FIG. 1 substantially in that the electric motor 24 is used not only for rotating the screw 14 but also together with the electric motor 45 for displacing the screw axially, to inject polymer into the mold. For this purpose, there is a second threaded drive with a threaded spindle 101 and with a threaded nut 102 as drive elements. The threaded spindle 101 is inserted between the splined shaft 16 and the axial rolling-contact bearing 18. The spindle nut 102 is supported axially on the housing 11 by means of an axial bearing 103, counter to the direction of movement of the screw 14, during injection. The spindle nut and threaded spindle have ball rolling threads and engage in each other by means of balls. The spindle nut is freely rotatable on the threaded spindle and can be blocked by a brake 104 against rotation in relation to the housing 11.

For plasticizing, the electric motor 24 rotates in one direction and for injection it rotates in the opposite direction. In order that the screw does not co-rotate during injection, a freewheel 105 is arranged between the latter and the splined shaft 16.

For plasticizing polymer, the electric motor 24 is driven in such a way that it rotates the splined shaft in a direction in which the freewheel 105 transmits the rotation to the screw 14. The injection mechanism 13 together with the screw 14 is rotated in such a direction that polymer material is conveyed in front of the screw. A certain pressure builds up there, with the tendency to displace the injection mechanism 13 together with the hydraulic piston 32 backward in the sense of reducing the cylinder chamber 36 of the piston-cylinder unit 30. With the shut-off valve 75 in the passage position, the speed of the threaded spindle 51, controlled by the electric motor 45, can be used as in the case of the exemplary embodiment according to FIG. 1 to set a specific back pressure or to proceed through a specific back pressure profile. The spindle nut 102 can rotate freely during the plasticizing, with axial support provided by the axial bearing 103, and does not hinder the backward movement of the threaded spindle 101 and consequently of the injection mechanism 13.

Once sufficient polymer material has been plasticized, before polymer is injected into the mold, the nozzle 15 is first brought up to the mold. This takes place as in the case of the exemplary embodiment according to FIG. 1 by the electric motor 45 rotating in a first rotating direction. The entire injection unit 10 moves to the left. After the displacement distance of the threaded spindle 51 necessary for bringing the nozzle 15 into contact with the mold, the clutch disk 53 has reached the clutch disk 64 of the other clutch 55.

Then the shut-off valve 95 is first brought into its shut-off position and then the clutch 56 is deactivated. No pressure medium can flow out of the cylinder chamber 39 of the piston-cylinder unit 31, so that the injection unit remains with the injection nozzle 15 against the mold. The electric motor 45 continues to rotate in the same direction, so that the threaded spindle 51 moves further to the left and as a consequence displaces the piston rod 63 and the hydraulic piston 62 to the left by means of the clutch disks 53 and 64. As a result, pressure medium is forced out of the cylinder chamber 67 of the piston-cylinder unit 60 via the line 69 and the open directional control valve 75 into the cylinder chamber 36 of the piston-cylinder unit 30. The hydraulic piston 32 exerts a forward force on the injection mechanism 13.

For injecting polymer, not only the electric motor 45 but also the electric motor 24 is driven. To be precise, the electric motor 24 rotates in a direction [lacuna] that the freewheel 105 does not transmit the rotation of the splined shaft 16 to the screw 14. The brake 104 blocks the spindle nut 102 against rotation, so that the threaded spindle moves to the left at a speed determined by the rotational speed of the electric motor 24. In this case, only part of the force necessary for the displacement has to be provided by the threaded drive 101, 102. The greater part of the force is exerted by the hydraulic cylinder 30, so that the threaded drive is not excessively loaded. On the other hand, because of the greater rigidity of the mechanical force transmission from the electric motor 24 via the threaded drive 101, 102 to the screw, the desired speed of the screw and the injection pressure can be maintained very exactly by changing the rotational speed or the torque of the electric motor 24.

What is claimed is:

1. A drive device for displacing first and second linearly movable components (10, 13) of a plastics injection-molding machine at least partly at successive times, in particular for displacing the first component that is an injection unit (10) for bringing an injection nozzle (15) into contact with a mold, and for displacing the second component that is an injection mechanism (13) for injecting polymer into the mold, wherein the drive device comprises an electric motor, first and second clutches, a threaded drive having a threaded spindle (51) and a spindle nut (50), and at least one shut-off valve;

wherein the electric motor (45) displaces the second component (13) by means of the first clutch (55) and the threaded drive;

wherein the electric motor displaces the first component (10) by means of the second clutch (56), the at least one shut-off valve (75, 95) connects between at least one of the clutches and a corresponding one of the first and the second movable components (10, 13), and the threaded drive is arranged between the electric motor (45) and the two clutches (55, 56), and wherein, for displacing one of the first and the second movable components (10, 13), the drive spindle (51) of the threaded drive is movable linearly beyond a displacement distance necessary for displacing the other of the first and the second movable components (13, 10).

2. The drive device as claimed in claim 1, wherein said first component (10) is displacable by an output drive element (51) in a first traveling range and said second component (13) is displacable by the output drive element (51) in a second traveling range, which is completely separate from the first traveling range.

3. The drive device as claimed in claim 1, wherein (10, 13) there is a hydraulic mechanism (60, 30; 80, 31) with a first piston-cylinder unit (60, 80), which has a first hydraulic piston (62, 82), bounding a first cylinder chamber (67, 57; 66, 86), and a second piston-cylinder unit (30, 31), having a second hydraulic piston (32, 37), bounding a second cylinder chamber (36, 39; 35, 40), pressure medium being exchangeable between the first cylinder chamber (67, 87; 66, 86) and the second cylinder chamber (36, 39; 35, 40) to move either the first component or the second component.

4. The drive device as claimed in claim 3, wherein the piston-cylinder units (30, 31, 60, 80) are double-acting.

5. The drive device as claimed in claim 3, wherein the second cylinder chamber (36, 39) is shut off by said at least one shut-off valve (75, 95) with respect to the first cylinder chamber (67, 87).

6. The drive device as claimed in claim 5, wherein the shut-off valve (75, 95) is a seat valve, by which the second cylinder chamber (36, 39) is shut off in a leak-free manner.

7. The drive device as claimed in claim 3, wherein there is a second threaded drive (101, 102) with two drive elements (101, 102) in engagement with each other, of which one drive element (101) is drivable in a rotating manner by a second electric motor (24) and of which one drive element (101) is arranged between the hydraulic mechanism (30, 60) and the displaceable component (13).

8. The drive device as claimed in claim 7, wherein the displaceable component is the plasticizing screw (14) of an injection mechanism and that the plasticizing screw (14) also is drivable in a rotating manner by the second electric motor (24).

9. The drive device as claimed in claim 1, wherein each clutch (55, 56) is electromagnetically operable.

10. The drive device as claimed in claim 1, wherein said clutches (55, 56) comprise an input clutch disk (53, 54) and an output clutch disk (64, 84) which lies axially opposite the input clutch disk, the output clutch disk is entrainable by the input clutch disk (53, 54) in one direction of movement and is entrainable by the input clutch disk (53, 54) in an opposite direction also by axial impingement.

11. A drive device for displacing first and second linearly movable component (10, 13) of a plastics injection-molding machine at least partly at successive times, in particular for displacing the first component that is an injection unit (10) for bringing an injection nozzle (15) into contact with a mold, and for displacing thin second component that is an injection mechanism (13) for injecting polymer into the mold, wherein the drive device comprises an electric motor, first and second clutches, and at least one shut-off valve wherein the electric motor (45) displaces the second component (13) by means of the first clutch (55), wherein the electric motor displaces the first component (10) by means of the second clutch (56), and the at least one shut-off valve (75, 95) connects between at least one of the clutches and a corresponding one of the first and the second movable components (10, 15);

wherein the electric motor is an electric linear motor with a linearly movable drive output element, arranged downstream of which, in force chains, are the two clutches (55, 56), and, wherein, for displacing one of the first and the second movable components (10, 13), the drive output element of the electric motor is movable beyond a displacement distance necessary for displacing the other of the first and the second movable components (13, 10).

12. The drive device as claimed in claim 11, wherein said first component (10) is displacable by output drive element (51) in a first traveling range and the second component (13) is displacable by the output drive element (51) in a second traveling range, which is completely separate from the first traveling range.

13. The drive device as claimed in claim 11, wherein (10, 13) there is a hydraulic mechanism (60, 30; 80, 31) with a first piston-cylinder unit (60, 80), which has a first hydraulic piston (62, 92), bounding a first cylinder chamber (67, 87; 66, 86), and a second piston-cylinder unit (30, 31), having a second hydraulic piston (32, 37), bounding a second cylinder chamber (36, 39; 35, 40), pressure medium being exchangeable between the first cylinder chamber (67, 87; 66, 86) and the second cylinder chamber (36, 39; 35, 40) to move either the first component or the second component.

14. The drive device as claimed in claim 13, wherein the piston-cylinder units (30, 31, 60, 80) are double-acting.

15. The drive device as claimed in claim 13, wherein the second cylinder chamber (36, 39) is shutable off by a shut-off valve (75, 95) with respect to the first cylinder chamber (67, 87).

16. The drive device as claimed in claim 15, wherein the at least one shut-off valve (75, 95) is a seat valve, by which thin second cylinder chamber (36, 39) is shutable off in a leak-free manner.

17. The drive device as claimed in claim 13, wherein there is a second threaded drive (101, 102) with two drive elements (101, 102) in engagement with each other, of which one drive element (101) is drivable in a rotating manner by a second electric motor (24) and of which one drive element (101) is arranged between the hydraulic gear mechanism (30, 50) and the displaceable component (13).

18. The drive device as claimed in claim 17, wherein the displaceable component is a plasticizing screw (14) of an injection mechanism and the plasticizing screw (14) also is drivable in a rotating manner by the second electric motor (24).

19. The drive device as claimed in claim 11, wherein each clutch (55, 56) is electromagnetically operable.

20. The drive device as claimed in claim 11, wherein said clutches (55, 56) comprise an input clutch disk (53, 54) and an output clutch disk (64, 84) which lies axially opposite the input clutch disk, the output clutch disk is entrainable by the input clutch disk (53, 54) in one direction of movement and is entrainable by the input clutch disk (53, 54) in an opposite direction also by axial impingement.

* * * * *